INVENTOR
Ronald E. Richardson

FIG. 10

United States Patent Office 3,455,197
Patented July 15, 1969

3,455,197
ADJUSTABLE GUILLOTINE AND TABLE FOR
SEVERING SHEET PLASTIC
Ronald E. Richardson, Oshawa, Ontario, Canada, assignor to PPG Industries, Inc., Pittsburgh, Pa., a corporation of Pennsylvania
Filed Dec. 15, 1966, Ser. No. 601,908
Claims priority, application Canada, Nov. 21, 1966, 975,986
Int. Cl. B26d 1/08, 3/10
U.S. Cl. 83—467                      7 Claims

ABSTRACT OF THE DISCLOSURE

A shearing apparatus particularly adapted for severing elongated flexible webs into blanks of various shapes, is described. The shearing device includes an elongated platform means comprising spaced sections each having continuous upper surfaces for supporting the flexible web material. First and second spaced cutting devices are associated with the platform for severing selected lengths of the flexible material from the supported web. One of the cutting devices is supported such that the distance between the first and second cutting devices may be varied to effect adjustments in the lengths of flexible material cut from the web. The sections of the platform are spaced from their respectively associated cutting devices thereby to provide recesses into which the end portions of selected lengths of material cut from the elongated web and lying on the platform may hang, clear of both the first and second cutting devices. The first and second cutting devices are also adjustable about axis normal to the platform to enable adjustment of the angle at which the web is severed with respect to the longitudinal axis of the platform.

This invention relates to shearing apparatus and has particular reference to shearing apparatus specially adapted for severing an elongated web into blanks of various shapes.

The present invention finds use in many fields. For example, in the manufacture of windshields for motor vehicles, a plastic interlayer is sandwiched between a pair of glass sheets, said interlayer serving to give to the finished product its well known "shatterproof" properties. Since a wide variety of models, designs and types of motor vehicles are produced, it is apparent that many shapes and sizes of windshield are required. Since the plastic interlayer previously referred to is required to be coextensive with the glass sheets which sandwich the same, it follows that a manufacturer of windshields of the nature referred to above must be able to provide in an economical manner a wide variety of shapes of plastic interlayer in order to meet the demand created by the varying designs of motor vehicle mentioned above.

The most popular shapes of automobile windshield require an elongated interlayer having the shape of a trapezium, i.e., having two sides parallel to one another, while the ends are not parallel to each other but make equal angles with the base of the trapezium (i.e., they are inclined towards one another). Such an interlayer is conveniently formed from an elongated web of plastic material having parallel edges by cutting across said web at selected intervals along its length, the angles made by each pair of cuts with respect to the longitudinal axis of the web being equal in magnitude but opposite in sense thereby to form a series of trapeziums as described briefly above.

One typical prior art device effecting severing of a web into selected lengths is shown in United States Patent No. 2,026,402. This device incorporates a support table for a web, the table having a shear associated therewith. The shear is adjustable about an axis normal to the plane of the support table to enable adjustment of the angle of cut of the web with respect to the longitudinal axis of the latter. Successive lengths of the web are drawn from a supply roll across the table and are severed by the shear at a desired and preselected angle to the web's longitudinal axis. A device of the nature described above is generally satisfactory when blanks having the shape of a parallelogram are to be severed from the web; however, if blanks having the shape of a trapezium (i.e., irregular quadrilaterals with one pair of opposing sides parallel) are to be produced, it is evident that the angle of cut of the shear must be changed after each cut thus greatly increasing the time spent in the web cutting operation. Prior art devices of the nature indicated above also have the disadvantage that each blank must be removed individually from the cutting apparatus immediately after each cut is made thus further increasing the required number of manual steps required in the cutting operation. Experience has also shown that the prior art has failed to provide a fully reliable and simple means for presetting the length of blank which is to be cut from the web and which may be easily adjusted when blanks of a different length are required.

One object of the invention is to provide apparatus for cutting a web into a large number of blanks of preselected shape and size and wherein provision is made for readily varying the length of said blanks as measured along the longitudinal axis of the web and the angles of their leading and trailing edges relative to said longitudinal axis.

A further object of the invention is to provide apparatus for cutting blanks from a web of material wherein the angles of cut with respect to the longitudinal axis of the web at opposing ends of the blank are different from one another (e.g., a trapezium shaped blank) the apparatus being designed such that no adjustment in the angle of its cutting means with respect to the web axis is necessary after each cut to produce blanks of the nature indicated above.

A still further object of the invention is to provide apparatus for cutting blanks from a web of material wherein there is provided a web supporting surface having cutting means associated therewith, the apparatus being designed such that the cut blanks may be permitted to accumulate on the supporting surface with the next succeeding length of the web being positioned for cutting over the accumulated blanks, thereby eliminating the necessity of removing the individual blanks from the apparatus immediately after severing of the web.

In accordance with one aspect of the invention there is provided apparatus for severing an elongated web of material into preselected lengths comprising, frame means, a first web cutting means mounted on said frame means, a carriage means, a second web cutting means mounted on said carriage means, means mounting said carriage means for movement in a predetermined path relative to said frame means towards and away from said first web cutting means thereby to vary the distance between said first and second web cutting means, and elongated platform means associated with said first and second web cutting means for supporting said elongated web of material in a position in a given plane for severing thereof by said first and second web cutting means into preselected lengths. In the preferred embodiment of the invention both of the cutting means are adjustable about axes which are normal to the given plane in which said platform means supports said elongated web.

In accordance with a further aspect of the invention there is provided a device for severing a web of material into selected lengths comprising; elongated horizontal platform means for supporting said web of material, first and second cutting means associated with said platform means for severing selected lengths of material from said supported web, said first and second cutting means being in predetermined spaced relationship with one another along the longitudinal axis of said platform means, said horizontal platform means including an intermediate section extending between said first and second cutting means, and a tail section extending beyond said second cutting means, said intermediate section being spaced from said first and second cutting means and said tail section being spaced from said second cutting means thereby to permit the end portions of selected lengths of material which have been severed from said web to overhang said platform sections clear of said first and second cutting means.

When using the apparatus of the present invention it will be noted that blanks having the outline of a trapezium may be cut from the web without necessitating any adjustment in the angle of the cutting means after each cut. This contrasts with the devices of the prior art which require that the angle of the cutting means be changed after each cut. When using the apparatus of the present invention, the angle which the cutting means make with the path of travel of the web need only be changed when a change in the shape of the blank is desired. Should a change in the overall length of the blank be desired the apparatus of the present invention permits ready adjustment of the distance between the two cutting means. It should also be realized that the two cutting means may or may not be positioned to make equal angles with the longitudinal axis of the web. Thus one of the cutting means could be positioned for cutting at right angles to the longitudinal axis of the web while the remaining cutting means is positioned at some different angle (say 75°) to the web axis thereby to produce blanks suitable, for example, for a half windshield of a car. Furthermore the design of the apparatus which permits successively severed blanks of web material to remain on the platform means until a desired number of such blanks have accumulated thereon reduces to a considerable degree the overall time required to produce the blanks thus effecting a saving in cost over the known production methods utilizing prior art equipment.

Further objects, aspects and advantages of the invention will become apparent from the following description of a preferred embodiment of the invention.

In drawings which illustrate an embodiment of the invention.

Figure 1:
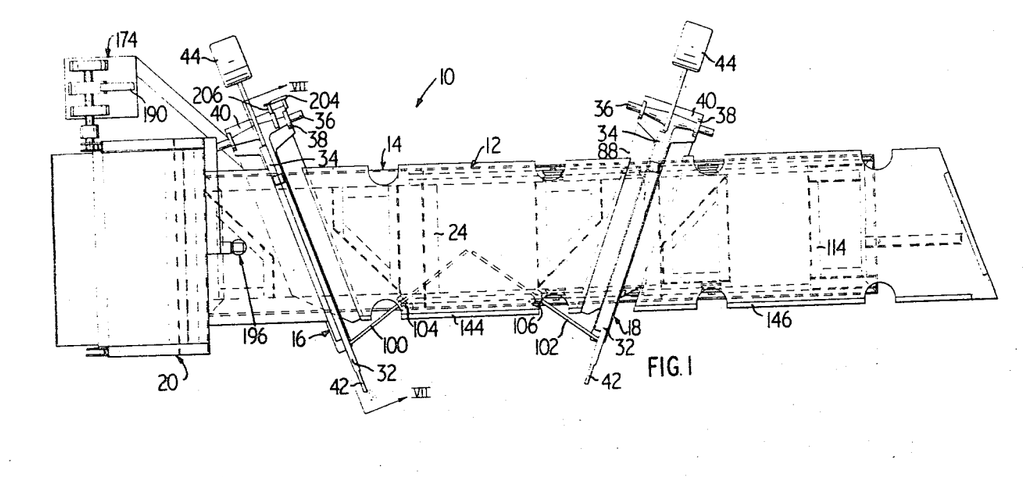
FIGURE 1 is a plan view of a cutting apparatus according to the invention.
Figure 2:
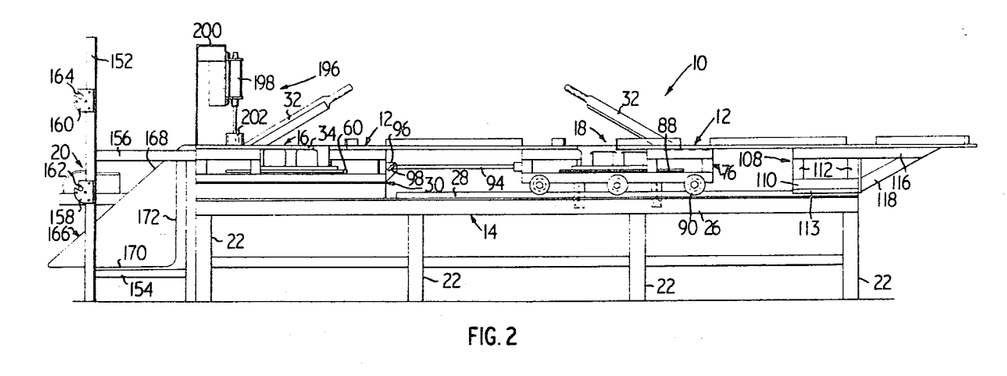
FIGURE 2 is a side elevational view showing a web cutting apparatus according to the present invention.
Figure 3:
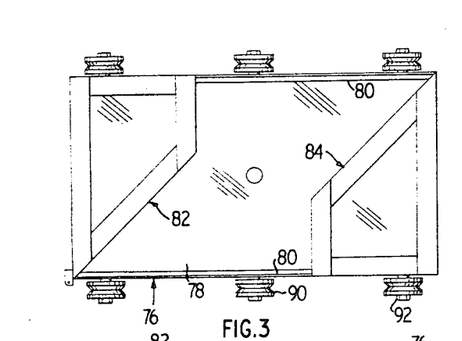
FIGURES 3 and 4 are plan and side elevational views respectively of a carriage for mounting one of the cutting units on the frame of the web cutting apparatus.
Figure 4:
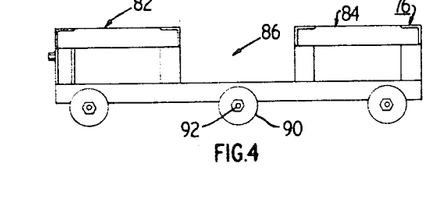

Referring firstly to FIGURES 1 and 2 of the drawings it will be seen that the apparatus for cutting the web includes a table generally indicated by reference 10. Table 10 includes a generally horizontal and elongated web supporting platform 12, the latter being supported above a frame generally indicated at 14. First and second cutting units 16, 18 respectively are supported on the frame 14 in a manner to be more fully described hereinafter, and are operatively associated with platform 12 such that a web positioned on the latter may be severed into blanks of a desired size and shape depending upon the orientation of the first and second cutting units 16, 18 with respect to both platform 12 and to each other. A cradle unit indicated at 20 is positioned adjacent one end of table 10 and is adapted to rotatably support a roll of web material such that a length of the web may readily be drawn from the cradle and be placed on the platform 12 in a position for cutting.

The frame 14 is conveniently of welded construction and consists of a plurality of pairs of vertically disposed legs 22 spaced horizontally from each other. The legs of each pair are interconnected at their upper ends by horizontally disposed transverse angle members 24 which extend across the width of frame 14, and the pairs of legs 22 are further interconnected at their upper ends by a pair of horizontally disposed longitudinal angle members 26 which extend the full length of the frame 14, one on each side of the latter.

Positioned and affixed to each of the longitudinal angle members 26 by welding or other suitable means are rails 28 which are transversely spaced from one another and which extend parallel to the length of the frame 14 and terminate just short of a sub frame 30 which is referred to hereinafter. The rails 28 conveniently comprise inverted angle members with the apex of the angle disposed upwardly thus defining an inverted V-shaped track cross section. Rails 28 provide support for the second cutting unit 18 as well as a portion of platform 12 as will be seen hereinafter.

The first and second cutting units 16 and 18 (FIGURES 1 and 7) may be of a conventional nature and they each include a movable blade 32 and a fixed blade 34 which coact with each other to sever the web material. The movable blade 32 is pivotally mounted by a pin 36 on a yoke 38, the latter being secured to a base member 40 having the fixed blade 34 secured thereto. The movable blade 32 includes a gripping handle 42 at its free end and a counterweight 44 mounted on an extension of blade 32 at the opposite end beyond the pin 36 such that the blade 32 may be readily raised and lowered by an operator. For the purposes of the present invention 40 inch "Jacques" Hand Shears model J-1446-M were found quite suitable. It should be mentioned here that it is desirable that each of cutting units include a clamping bar for clamping the web with respect to the fixed cutter blade 34 during severing. A clamping bar is not shown in the drawings since as mentioned above, the shear of which the clamping bar forms part is commercially obtainable.

Figure 5:
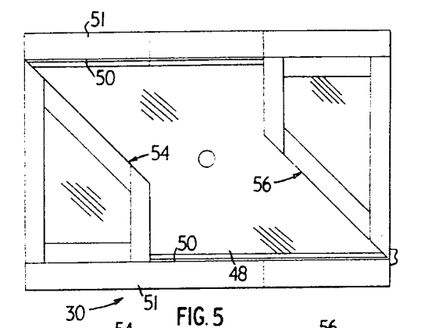
FIGURES 5 and 6 are plan and side elevational views respectively of a sub frame assembly for mounting a further one of the cutting units on the frame of the web cutting apparatus.
Figure 6:
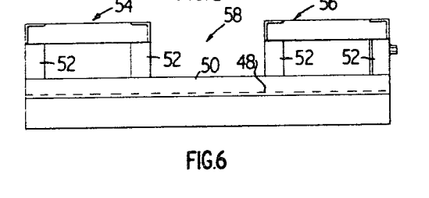

The first cutting unit 16 is supported upon the sub frame 30 (FIGURES 5 and 6). Sub frame 30 is mounted on the longitudinally extending members 26 adjacent one end of frame 14 and rear to the cradle assembly 20, by means of suitable bolts or by welding. Sub frame 30 is of generally rectangular configuration and comprises a rectangular base plate 48 having angle members 50 affixed thereto and extending about the periphery thereof, base plate 48 being mounted upon horizontally disposed and mutually perpendicular channel members 51 which together define a rectangular outline and serve to support the base plate 48 on the longitudinally extending members at a level which is at a desired distance above the level of the longitudinally extending members 26. Extending upwardly from the base plate 48 are a plurality of upright posts 52 which terminate in a common plane and serve to support units 54 and 56 thereon. The units 54 and 56 are conveniently constructed from four angle members three of which are parallel to the edges of base plate 48 while the fourth is disposed at an angle to the longitudinal axis of the frame 14. The units 54 and 56 serve to define an upper support level for the platform 12, the latter being spaced above and extending over the whole of the frame 14. The units 54 and 56 are positioned over diagonally opposed corners of the base plate 48 with their respective angularly disposed members facing each other to define therebetween an elongated passageway 58 which permits limited pivotal movement of the cutting unit 16 disposed therein about a vertical axis which passes through the center of the base plate 48.

Figure 7:
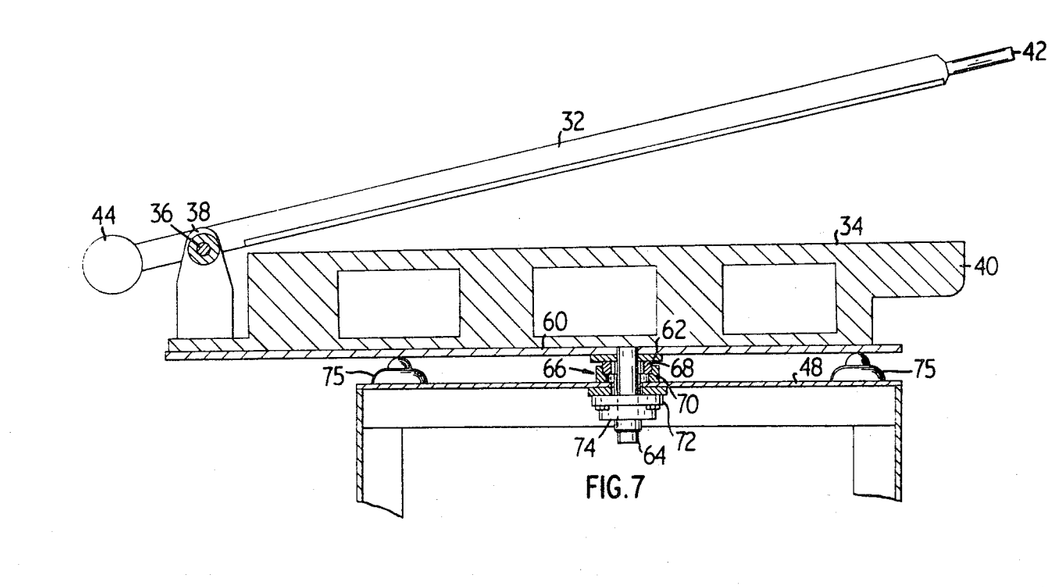
FIGURE 7 is a cross section view taken along section 4—4 in FIGURE 1 and illustrating the pivot mount for one of the cutting units.

As seen in FIGURE 7, the cutting unit 16 is mounted upon a turntable 60, the latter having a centrally located bearing plate 62 and a stub shaft 64 rigidly secured thereto and perpendicular to the plane of turntable 60, the axis of stub shaft 64 defining the vertical axis of pivoting of the cutting unit 16. Base plate 48 has an aperture centrally located therein whereat is located a bearing assembly 66 including a thrust bearing 68 on which rests the bearing plate 62 with the bearing assembly receiving the stub shaft 64. The bearing assembly 66 includes a ring 70 disposed coaxially of the aperture in the base plate 48 and secured to the latter, said ring having an annular aperture therein which serves to contain the thrust bearing 68. Secured to the base plate on the side thereof opposite to the ring 70 is a bearing 72 which constrains the stub shaft 64 against undesirable lateral movement. A collar 74 secured to the lowermost end of the stub shaft 64 limits axial movement of the latter. Also secured to the base plate are a plurality of ball transfers 75, for example five on each side of the machine positioned in spaced relationship to one another and in lines parallel to the longitudinal axis of the machine. Hence at any angular position of the knife the turntable 60 is supported by six ball transfers (three on each side of the machine). It is therefore seen that the cutting unit 16 may be pivoted about a vertical axis which is located midway of the width of the table. The extent of such pivotal movement will, of course, be limited by the presence of the units 54 and 56 and in practice the outline or shape of the latter will be chosen so that the desired amount of pivotal movement of cutting unit 16 may be obtained.

The second cutting unit 18 is situated generally midway of the length of the frame 14 and is mounted upon a carriage 76 (FIGURES 1, 2, 3 and 4). The body of carriage 76 is substantially the same in construction as the sub frame 30 and includes a base plate 78 having secured about the periphery thereof for purposes of rigidity angle members 80. Support units 82 and 84 are positioned over diagonally opposed corners of base plate 78 to define a passageway 86 and they are both substantially coplanar with the unit 56 of the sub frame 30 for the purpose of supporting the platform 12. The support units 54 and 56 of sub frame 30 and the support units 82, 84 of the carriage 76 are preferably positioned such that the respective passageways 58, 86 defined by these units bear angles which are equal in magnitude and opposite in sense with respect to the longitudinal axis of frame 14. As with sub frame 30, the base plate 78 of carriage 76 has a thrust bearing assembly located centrally thereof identical to that shown in FIGURE 7 to support the second cutting unit 18 for pivoting about a vertical axis on a second turntable 88.

The carriage 76 is rollingly supported on the rails 28 by means of a plurality of rollers 90, in the embodiment shown, six in number, three rollers rotatably affixed by suitable axle means 92 on each side of the carriage. Each roller 90 is provided with a V-shaped groove extending about its periphery which engages with the upwardly disposed apex of the rails 28. It is therefore apparent that the second cutting unit 18 is movable towards and away from the first cutting unit 16, as carriage 76 moves along the path of travel defined by rails 28.

In order to secure the carriage 76 against undesirable movement along its path of travel, a rod 94 is secured to carriage 76 (see FIGURES 2 and 9), said rod extending towards the sub frame 30 and passing through a collar 96 secured to the latter. The collar 96 is provided with a clamp screw 98 which is adapted to frictionally engage rod 94 thereby to secure the carriage 76 against undesirable motion. When it is desired to move carriage 76 the clamp screw 98 is manually released thereby permitting the rod 94 to slide through the collar 96 as the carriage 76 is moved along the rails 28.

In order to prevent undesirable pivoting motion of the cutting units 16 and 18, the latter have respective tie rods 100, 102 secured thereto as shown in FIGURE 1. The tie rods 100, 102 are pivotally secured at their respective first ends to the base portions of each of the cutting units 16, 18 and the tie rods 100, 102 pass through respective clamps 104, 106, the former being affixed to sub frame 30 while the latter is affixed to the carriage 76. When it is desired to pivot the cutting units about their vertical axes the clamps 104, 106 are released, thereby allowing the tie rods associated therewith to slide freely therethrough as the cutting units rotate about the vertical axis.

Referring to FIGURES 1 and 2 it will be seen that there is an additional support frame 108 which is slidably mounted on the rails 28 adjacent the end of frame 14 remote from sub frame 30. The support frame 108 includes four mutually perpendicular angle members 110, the latter having four posts 112 extending upwardly therefrom to support a rectangular unit 114 (shown in dotted lines in FIGURE 1) in a horizontal plane corresponding to the plane defined by units 54, 56 of sub frame 30 and support units 82 and 84 of carriage 76. A further horizontal support member 116 at the same level as unit 114 projects outwardly of the end of frame 14 and is provided with a suitable brace 118. The support frame 108 is slidably mounted on the rails 28 by means of a pair of inverted V angle irons 113, the latter being secured to opposing sides of support frame 108 at the bottom thereof such that they engage rails 28. The support frame 108 is thus capable of sliding along rails 28; the rails 28 may, if desired, be lubricated to facilitate such sliding.

Figure 8:
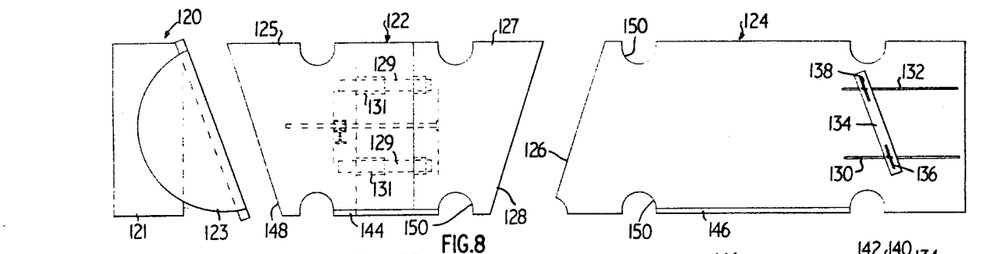
FIGURES 8 and 9 are plan and elevation views of the elongated platform of the web cutting apparatus for supporting web material for cutting.
Figure 9:
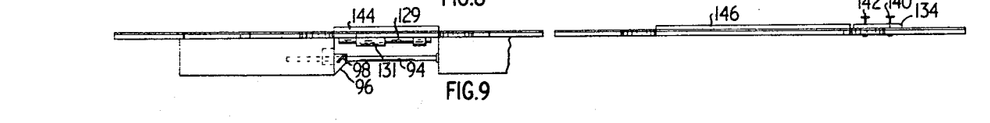

Platform 12 which was referred to previously is positioned and supported by the sub frame 30, carriage 76 and upon support frame 108. Platform 12 extends from the feed end of frame 14 (adjacent cradle 20) to a point beyond the opposing or delivery end thereof. The platform 12, as best seen in FIGURES 8 and 9 is comprised of three main sections, a feed end section 120, an extensible intermediate section 122 and a tail section 124. Each of these sections conveniently consist of a heavy plywood overlaid with a heavy fibreboard, such as a product sold under the trade name "Masonite." The feed end section 120 is secured to and supported upon sub frame 30 and is in two parts, a generally rectangular part 121 and a part 123 shaped as a segment of a circle. The segmental part 123 consists only of the relatively thin fibreboard having a reinforcing strip underlying the straight edge portion thereof. The generally rectangular portion 121 has a segment-shaped portion of its fibreboard overlay removed to permit the segmental part 123 to be partially contained therein with the surfaces of the parts 121 and 123 lying flush with each other. The straight edged portion of the segmental part 123 abuts and rests upon a portion of the base upon which the fixed blade 34 of the first cutting unit 16 is mounted such that when the latter is pivoted about its vertical axis, the segmental part 123 moves therewith.

The extensible section 122 extends from a point over the sub frame 30 to a point over carriage 76 with their respective units 56 and 82 affixed to and supporting respective opposing end portions of the extensible section. The opposing ends of the extensible section are shown as being angularly disposed with respect to the longitudinal dimension of the table, so as to correspond approximately with the angularly disposed passageway 58 defined by the table top support units 54 and 56 of sub frame 30 and the passageway 86 defined by support units 82 and 84 on the carriage 76.

The extensible section 122 includes a first portion 125 and a second portion 127. The first portion 125 has a part of its overlay extended outwardly to overlie an area of the second portion 127 which has the overlay removed therefrom such that the outwardly extended part of the first portion 125 is flush with the uppermost surface of second portion 127. The first portion 125 has guide bars 129 (which extend parallel to the longitudinal axis of the platform) attached to its underside by suitable fasteners, the guide bars 129 extending beneath the extensible section 122 and passing through a pair of aligned channels 131 fastened to the underside of second portion 127. It is therefore apparent that extensible section 122 is increased or decreased in length to accommodate changes in the position of the carriage 76 as the latter is shifted along the rails 28.

The tail section 124 has its leading edge 126 angularly disposed to the longitudinal dimension of the frame 14 such that it is substantially parallel to the trailing edge 128 of the extensible section 122. The tail section 124 is supported on and secured at its forward end to support unit 84 of carriage 76 while the rearward end thereof is secured to and supported by the support frame 108. When the position of carriage 76 is changed the position of the tail section 124 is, of course, correspondingly changed with the support frame 108 sliding along the rails 28. Tail section 124 is provided with a pair of elongated slots 130, 132 which extend parallel to the longitudinal axis of the frame 14 on opposite sides of the center line of the latter. A slat 134 is positioned on the surface of the tail section such that it extends from beyond one side of slot 130 to beyond the other side of slot 132. Slat 134 also contains two elongated apertures 136 and 138 therein. Threaded screw clamps 140 and 142 pass through the respective apertures 136, 138 in slat 134 and through respective slots 130, 132 in the tail section 124 and thence into suitable threaded nuts on the underside of the latter. When the screw clamps are released, the slat 134 may be moved towards and away from the second cutting unit 18, and may be rotated in a horizontal plane such that it bears a desired angular relationship with respect to the cutting units. The slat 134 serves as an index such that the web material may be properly positioned on the platform 12 for cutting.

So that a web may be guided along the platform 12 with the centerline of the latter and the web centerline in parallelism elongated guide members 144 and 146 are affixed to the edges along one longitudinal side of the extensible and tail sections 122 and 124 respectively.

As may readily be seen in FIGURE 1 when the three main sections of the platform 12 are in position, the leading edge 148 of the extensible section is spaced from the first cutting unit 16 such that when a web extending along the platform is severed by the latter, the cut edge of the web material lying on the extensible section 122 hangs downwardly into the pasageway 58 clear of the cutting unit. In similar fashion, the trailing edge 128 of the intermediate section 122 and the leading edge 126 of the tail section 124 are spaced from the second cutting unit 18 such that the ends of the material cut by the latter hang downwardly into the space so formed. This spacing of the platform sections from the cutting units is important in that it permits succesive lengths of web material to be drawn over the surface of previously severed lengths of web material without danger of the cut ends of the latter being caught up and turned back thereby disrupting the formation of a neat and wrinkle free pile of sheets.

In order to facilitate removal of the cut lengths of material from the platform spaced cut outs 150 are provided along both sides of the latter. These cut outs enable the operating personnel to grasp a stack of cut sheets and remove same from the platform surface. It is also noted here that the intermediate section 122 and the tail section 124 of platform 12 are positioned at an elevation which is a short distance below the level of the uppermost surfaces of the feed end section 120 and the fixed blade portions of the cutting units 16 and 18. A difference in elevation of approximately one inch has been found suitable; this facilitates the accumulation of a stack of cut blanks one inch high before removal thereof becomes relatively desirable.

Located at one end of frame 14 is the cradle 20 which, as previously mentioned, is adapted to rollingly support a roll of web material such that a length of said web may be readily drawn therefrom towards the cutting units 16 and 18. The cradle 20 as seen in FIGURES 1 and 2 comprises a pair of horizontally spaced and vertically disposed posts 152 which are braced from the end of frame 14 and affixed relative thereto by means of horizontally extending lower braces 154 and upper braces 156.

Each of the posts 152 has secured thereto brackets 158 and 160 disposed on posts 152 in vertically spaced relationship. The brackets 158 and 160 have respective elongated slots 162 and 164 therein which extend inwardly and downwardly of the brackets such that the shaft of a roll of web material may be received and contained therein. The vertically spaced brackets 158 and 160 on each of the posts 152 permit two rolls of material to be supported and cut into blanks simultaneously. The idea could be extended to permit cutting of three or four superimposed webs simultaneously. Each bracket may preferably include a pair of horizontally disposed rollers (not shown) positioned with respect to the slot in the bracket such that the shaft of the roll of material may be supported on the rollers clear of the edges of the slot thereby permitting free rotation of the roll of web material.

The cradle also includes a partial enclosure 166 for the roll or rolls of web material when supported in the cradle. The enclosure 166 includes side walls 168 and a horizontally disposed floor 170. The latter is connected to a verticaly disposed wall 172 adjacent the end of the frame 14. The upper portion of wall 172 is curved over and is suitably attached to the end of platform 12 to provide a smooth path of travel for the web as it proceeds from the supply roll in the cradle 20 to the first cutting unit 16.

Figure 10:
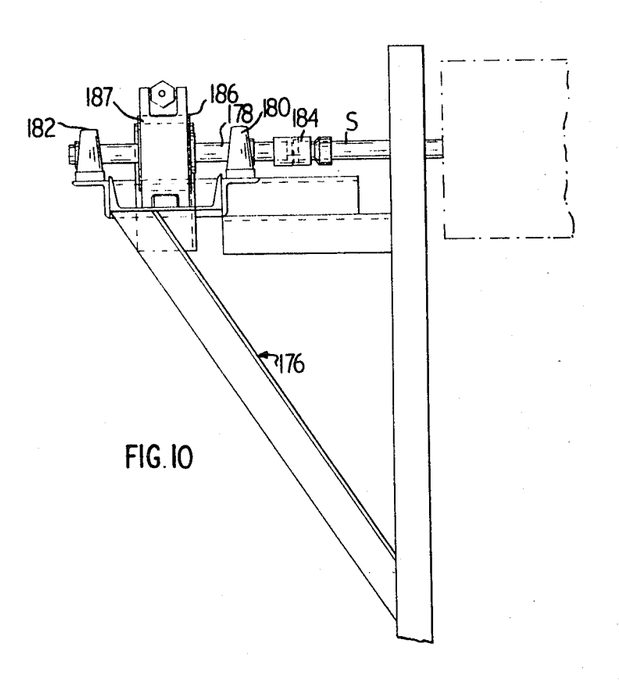
FIGURE 10 is an elevation view of a brake assembly for a supply roll looking from the left hand side of FIGURE 1.

In order to prevent over-running of the roll of web material when a length of the web is removed rapidly therefrom a brake assembly 174 as shown in FIGURES 1 and 10 is supported on the side of the cradle 20 by means of a suitable bracket 176. The brake assembly includes a shaft 178 journalled in bearing blocks 180 and 182. Shaft 178 is aligned with the roll shaft S and connected for rotation therewith by a coupling 184. The brake assembly also includes drum 186, pivotally mounted brake shoes 187 adapted to engage the circumference of said drum, and a brake shoe actuating lever 190. The brake assembly is conveniently of the commercially obtainable type, for example a "Cutler-Hammer" Type S, Size 4, No. 511H650. A pneumatic cylinder (not shown) is secured to the bracket 176 and the ram of said cylinder is pivotally attached to the lever 190. A pneumatic switch (not shown) located in a convenient position (preferably at the rearward extremity of the tail section of platform 12 so that it may be actuated by the operator at the tail end) is actuated by the operator when it is desired to effect braking of the supply roll. When more than one supply roll is used additional brakes are required, all of which are controlled from a common control switch.

In order to secure the web material for cutting there is provided a web clamping assembly 196, shown in FIGURES 1 and 2, which comprises an air cylinder 198 suspended from a bracket 200. The latter is affixed to the side of table 10 immediately adjacent the cradle 20. Connected to the ram of the air cylinder 198 is a weighted presser foot 202 which is adapted to make contact with the web material overlying the feed end section 120 of the platform 12. The presser foot 202 is normally held in a raised position clear of the web material by the action of pressurized air received by cylinder 198 from a source (not shown). Affixed to the yoke 38 of the first cutting unit 16 by a suitable bracket is a bleed valve 204 adapted to make contact with a control arm 206 which is affixed to the movable blade 32. The control arm 206 is angularly positioned on the hub 208 such that contact of said arm with a button on the bleed valve 204 is made only when blade 32 is in its lowered or cutting position. When contact of arm 206 is made with the button on the bleed valve 204, the air pressure within cylinder 198 is released and the presser foot 202 drops down and engages the web material and secures the same against movement during cutting.

The web cutting apparatus is operated as follows: Firstly the cutting unit 16 and 18 are angularly positioned by pivoting same about their vertical pivot axes until the cutting blades make selected angles with respect to the longitudinal axis of the platform 12. If trapezium shaped blanks are desired then both of the cutting units will be disposed such that they are at equal but opposite angles with respect to the longitudinal axis of the platform 12. Other shapes of blanks might require that the cutting units be positioned such that they make unequal angles with the longitudinal axis of the web. The carriage 76 is then shifted along its path of travel on rails 28 until the second cutting unit 18 supported thereon is positioned a desired distance away from the first cutting unit 16. The indexing slat 134 is then positioned such that it makes a desired angle with the longitudinal axis of the platform 14 (in practice slat 134 will be positioned parallel to the first cutting unit 16) and is at the desired distance from the second cutting unit 18 (when equal length blanks are desired this distance will be equal to the distance between the first and second cutting units measured along the web axis).

The end of the web of material is then drawn from the supply roll on the cradle 20 over the feed end section 120 of the platform and over the fixed blade 34 of one of the cutting units 16 or 18, the cutting unit being thereafter actuated to sever the web. The newly cut edge will then have the desired angular relationship with the medial axis of the web. The web is then drawn along the platform 12 and the newly cut edge is placed in abutting relationship with the indexing slat 134. Then both of the cutting units 16 and 18 are actuated thereby severing from the web two lengths of the web material. The severed lengths are allowed to remain on the intermediate and tail sections of the platform 12 while a further length of the web is drawn thereover and the leading end thereof placed in abutting relationship with the slat 134. The two cutting units are then again actuated to cut the web and the cut lengths of web allowed to remain on the platform 12. This process is repeated a plurality of times until a desired number of the cut lengths of web have built up on the platform surface, after which the stacks are lifted from the platform 12 by the operating personnel and transported to a storage area. It will be realized of course that a plurality of superimposed webs of material may be cut simultaneously; in this case the superimposed webs are handled in exactly the same manner as outlined above.

The form of the invention shown and described herein represents an illustrative preferred embodiment and a modification thereof. It is understood that various changes may be made without departing from the spirit of the invention as defined in the claimed subject matter that follows.

I claim:

1. Apparatus for severing an elongated web of flexible material into preselected lengths comprising: frame means, a first web cutting means mounted on said frame means, a carriage means, a second web cutting means mounted on said carriage means, means mounting said carriage means for movement in a predetermined path relative to said frame means towards and away from said first web cutting means thereby to vary the distance between said first and second web cutting means, and elongated platform means associated with said first and second web cutting means comprising spaced sections, each having continuous upper surfaces for supporting said elongated web of flexible material in a position for severing thereof by said first and second web cutting means into preselected lengths, said spaced sections of said elongated platform comprising, a first section positioned adjacent said first web cutting means, a second section extending intermediate said first and second web cutting means and a third section extending beyond said second web cutting means, said continuous upper surfaces of said sections being substantially co-planar with each other and being at a preselected elevation with respect to said cutting means to permit said elongated web to be freely drawn over said platform from the first section thereof to said third section prior to severing of said web by said first and second cutting means, and wherein opposing ends of said second section are spaced from the respective first and second web cutting means, the end of said third section adjacent said second web cutting means being spaced from the latter thereby to permit the end portions of preselected lengths of material severed from said web to overhang said ends of said second and third sections clear of the first and second cutting means.

2. Apparatus according to claim 1 wherein both of said first and second web cutting means have bearing means operatively associated therewith for pivoting said respective cutting means about axes perpendicular to said platform means.

3. Apparatus according to claim 1 wherein said third section of said platform has indexing means mounted thereon, said indexing means comprising an elongated member rotatable in a plane parallel to the plane of said platform, means permitting movement of said elongated member towards and away from said second web cutting means, and means for clamping said elongated member to said third section of the platform.

4. Apparatus according to claim 1 further including means for rotatably supporting a roll of said web material, the latter said means being positioned adjacent one end of said elongated platform whereby a length of said elongated web may be drawn therefrom and thence positioned over the surface of said platform in position for severing thereof by said web cutting means.

5. A device for severing an elongated web of flexible material into selected lengths comprising:
elongated horizontal platform means comprising spaced sections each having continuous upper surfaces for supporting said web of flexible material,
first and second cutting means associated with said platform means for severing selected lengths of the flexible material from said supported web, said first and second cutting means being in spaced relationship with one another along the longitudinal axis of said platform means,
said horizontal platform means including an intermediate section extending between said first and second cutting means, and a tail section extending beyond said second cutting means, said intermediate section being spaced from said first and second cutting means and said tail section being spaced from said second cutting means thereby providing spaces which permit the selected lengths of material which have been severed from said web to lie on said platform sections with their end portions hanging downwardly into said spaces clear of said first and second cutting means.

6. The device of claim 5 wherein said first and second cutting means are adjustable about axis normal to said platform means to enable adjustment of the angle at which said web is severed with respect to the longitudinal axis of said platform means.

7. The device of claim 5 further including means mounting said second cutting means for movement in a path of travel towards and away from said first cutting means thereby permitting adjustment of the length of the flexible material severed from said web by said cutting means.

References Cited
UNITED STATES PATENTS

| | | | |
|---|---|---|---|
| 1,216,315 | 2/1917 | Heckman | 83—517 |
| 1,776,861 | 9/1930 | Leichner | 83—517 |
| 1,916,380 | 4/1933 | Leland | 83—517 X |
| 2,017,752 | 10/1935 | Fisher | 83—516 X |
| 2,026,402 | 12/1935 | Schlemmer | 83—559 X |
| 2,767,789 | 10/1956 | Budlong et al. | 83—559 X |

FOREIGN PATENTS 616,863  8/1935  Germany.

JAMES M. MEISTER, Primary Examiner

83—517, 559, 598